M. M. NIXON.
MACHINE FOR DIGGING PEANUTS OUT OF THE GROUND.
APPLICATION FILED JUNE 24, 1920.

1,401,486.

Patented Dec. 27, 1921.
4 SHEETS—SHEET 3.

INVENTOR.
Mordecai M. Nixon,
BY
ATTORNEYS.

M. M. NIXON.
MACHINE FOR DIGGING PEANUTS OUT OF THE GROUND.
APPLICATION FILED JUNE 24, 1920.
1,401,486.
Patented Dec. 27, 1921.
4 SHEETS—SHEET 4.
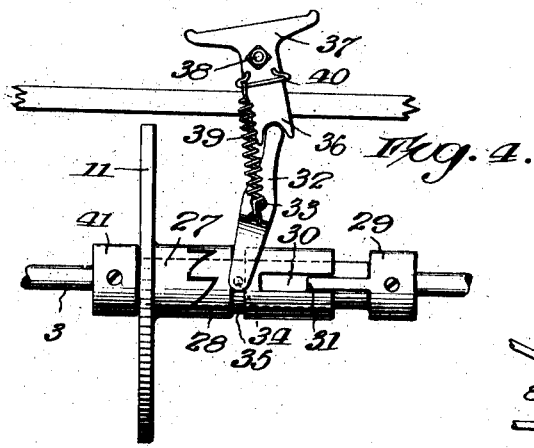
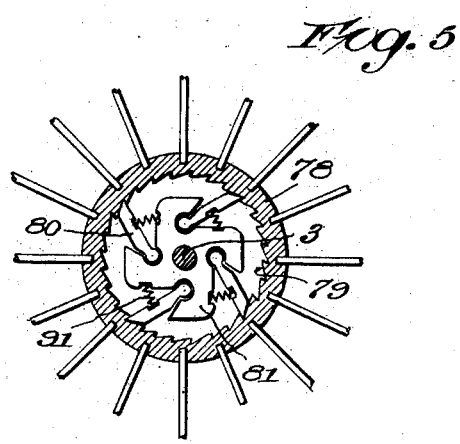
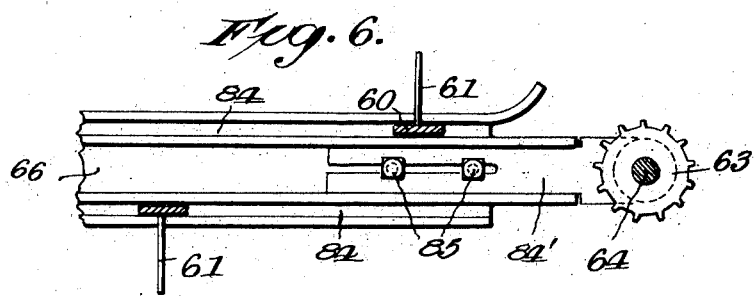
INVENTOR.
Mordecai M. Nixon,
BY
ATTORNEYS.

UNITED STATES PATENT OFFICE.

MORDECAI M. NIXON, OF EDENTON, NORTH CAROLINA.

MACHINE FOR DIGGING PEANUTS OUT OF THE GROUND.

1,401,486.  Specification of Letters Patent.  Patented Dec. 27, 1921.

Application filed June 24, 1920.  Serial No. 391,325.

*To all whom it may concern:*

Be it known that I, MORDECAI M. NIXON, a citizen of the United States, residing at Edenton, in the county of Chowan and State of North Carolina, have invented certain new and useful Improvements in Machines for Digging Peanuts Out of the Ground, of which the following is a specification.

My invention relates to that class of machines which is adapted to agricultural uses, and the chief object whereof is to dig up plants, particularly such as have valuable roots or tubers, etc., and remove the adhering earth from the roots by a cleaning process.

Specifically, my invention relates to a machine particularly adapted to dig up peanuts, and operates to remove the entire plant, with its roots and seeds bodily from the ground, and thereafter automatically removes adhering earth by subjecting the plant to vibration, without tearing the peanuts off the plant.

Other objects and advantages of my invention will be pointed out in this specification and claims, and still others will be evident from a study of the accompanying drawings which illustrate one embodiment of my invention, and wherein:

Fig. 4 is a detail view showing a clutch and a pedal for throwing the same into or out of action. This clutch is interposed between the axle of the road wheels and the mechanism driven thereby;

Fig. 5 is a detail sectional view on line 5—5 of Fig. 3 showing the mechanism inclosed in the hub of the right hand road wheel. A similar device, except that its teeth and pawls are directed oppositely, is located in the other hub; and Fig. 6 is a fragmentary detail of a part of the conveyer shown in Figs. 1, 2 and 3.

In all the views, like parts are designated by the same reference characters.

Figure 1:
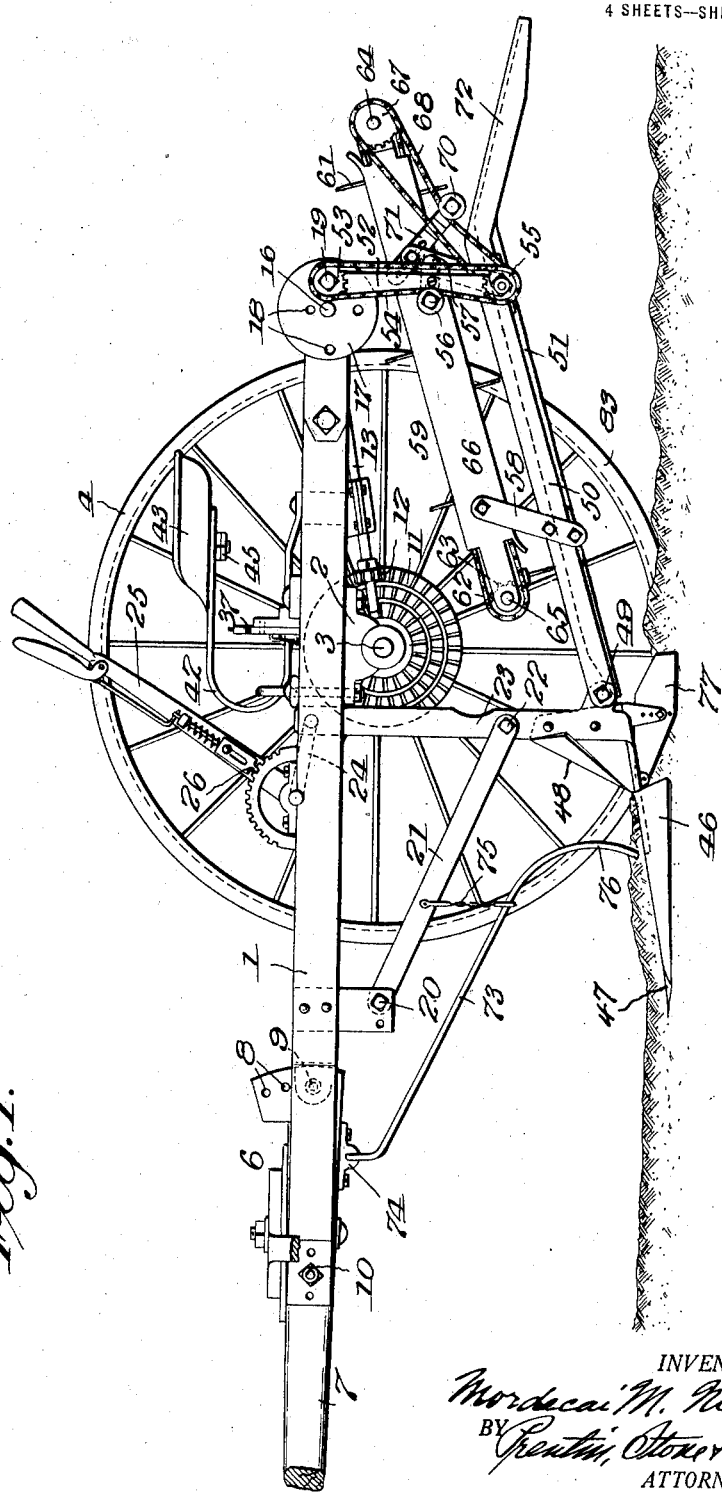
Figure 1 is an elevation of the left side of the machine with certain parts in the positions they assume when the machine is in operation, the left road wheel being omitted to avoid concealing the rest of the structure.
Figure 2:
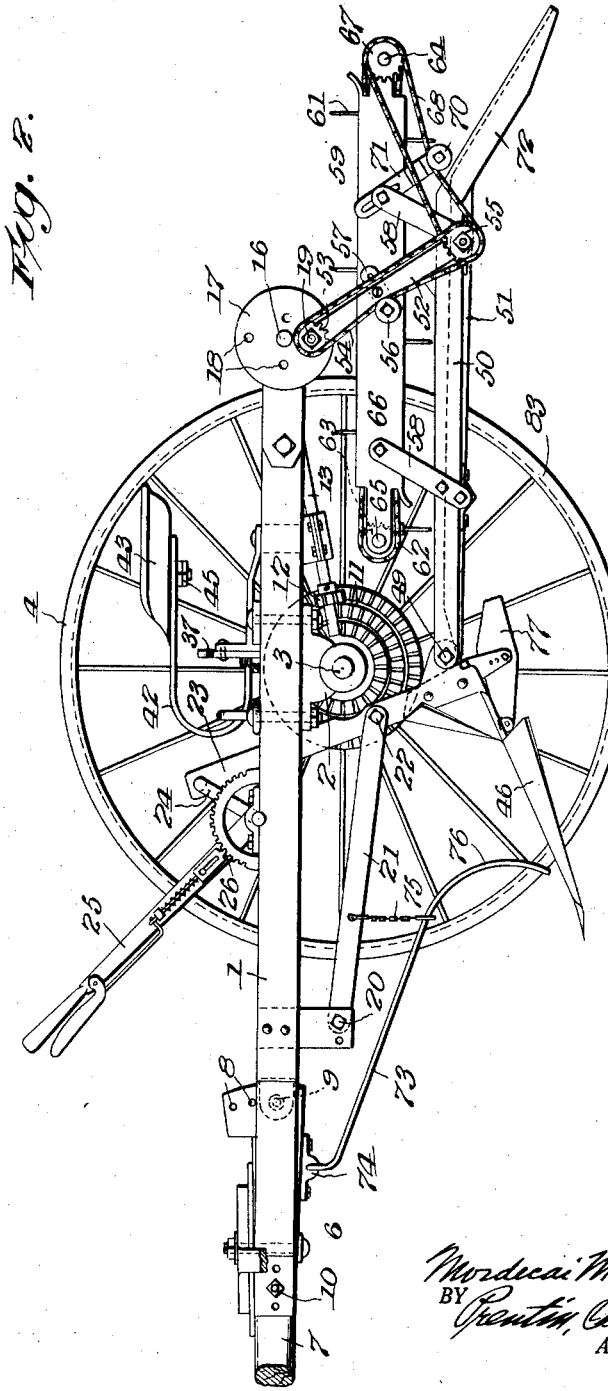
Fig. 2 is an elevation of the same side with these parts in their inactive positions, which they assume when the machine is not in use or while the machine is being drawn to or from its work.
Figure 3:
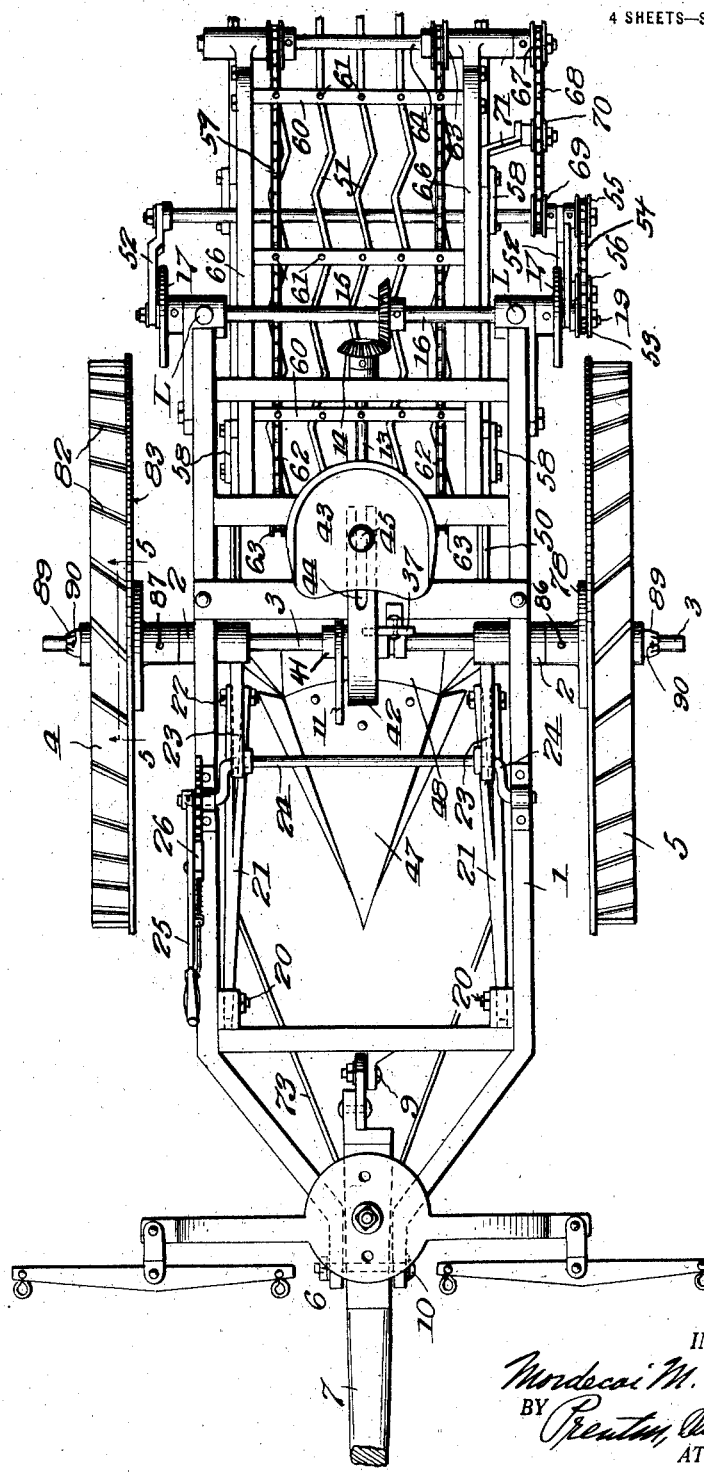
Fig. 3 is a plan view of the machine shown in Figs. 1 and 2.

Referring first to Figs. 1, 2 and 3, the machine comprises a framework 1 carrying suitable bearings 2 wherein is journaled an axle or shaft 3, carrying at its ends the road wheels 4 and 5. These wheels should have means to prevent side slipping, such as flanges, cleats, etc., as is usual. As shown these wheels 4 and 5 have tractive cleats or projections 82 on their road surfaces, as well as flanges 83 at their inner edges, to prevent side-slipping of the machine while in use. At one end of the frame 1 is provided the usual draft means 6, here shown as adapted for a two horse team, although it is obvious that this may be varied without departing from the invention. Means for altering the angle of the pole or tongue 7 are shown at 8 and 9, the tongue 7 being pivotally connected to frame 1 by the bolt 10, and being capable of adjustment at its rear end by inserting the bolt 9 through the desired one of the series of holes 8, thereby rigidly securing the tongue to the frame 1 at the proper tilt or angle. This may be of importance in determining the depth to which the plow penetrates the ground and other characteristics of operation of the machine, as will be presently described.

Arranged to be rotatable freely on shaft 3 is the drive wheel 11, shown as a selective multiple gear drive, although, of course, a drive of any other character may be used if preferred, and the drawing is to be understood as a diagrammatic showing illustrating either type of drive means. The driven element 12, coöperating with 11, imparts rotation to the shaft 13, which carries at its end a drive means, 14, shown as a bevel gear, Fig. 3. A driven means 15, here shown also as a bevel gear, coöperates with means 14 to be driven thereby, and to impart rotation to shaft 16. The shaft 16 bears at each end a crank element 17, here shown as a disk with a number of holes 18 therein, at various distances from the center, each adapted to receive the crank pin 19, whereby said crank element acts at different effective lengths, as desired. The purpose of this adjustability will be explained hereinafter.

Attached pivotally to the left side of the frame 1, at 20, is a link 21, a similar link 21 being provided at the right side of the machine. The rear ends of these links are connected to the members 23, 23, which serve to raise and lower the plow as well as to hold it rigidly in its adjusted positions. Two different positions are shown in Figs. 1 and 2. The members 23, 23 are connected at their upper ends to the crank arm 24, which has secured to one end the hand lever 25, having the usual holding pawl and ratchet 26 of any well known type, to retain the lever in its adjusted position.

A clutch, shown best in Fig. 4, is arranged on shaft 3, and comprises a portion 27 rigid with element 11, and an engaging portion 28 arranged to slide on member 29 which is secured to the shaft 3, a slot 30 in member 28 receiving a driving key or feather 31 on member 29, whereby the shaft 3, through member 29 and feather 31, will positively drive member 28. As shown, both elements 27 and 28 are provided with teeth which are adapted to interengage when the member 28 is slid to the left as shown in Fig. 4, thereby positively connecting the disk 11 to the shaft 3, and disengaging said disk when thrown to the right. The position of member 28 is controlled by lever 32, pivotally supported at 33, and having at its lower end a pin 34 engaging in the slot 35 of member 28. The upper end of lever 32 coöperates with the lower end 36 of the pedal 37, which is shaped to fit the lever 32, as shown. Pedal 37 is pivotally secured at 38 to the frame 1, and lever 32 is pivotally secured to the frame 1 at 33. A spring 39 is held to the lever 32 and pedal 37, as shown. The spring is under tension and consequently will slide from one side to the other of the bail 40 which holds it to the pedal 37, depending upon whether the pedal is shifted one way or the other. The spring therefore serves to bias the clutch in either its engaged or disengaged position. A collar 41 secured to shaft 3 limits the motion of disk 11 to the left. A seat 43 is adjustably secured to the spring support 42 by means of the bolt and nut 45 coöperating with the slot 44 in the opening, and is so positioned that the lever 25 is convenient to the right hand of the driver, and the pedal 37 likewise convenient to his left foot, although these elements may be otherwise located if preferred.

The plow 46 has a detachable "point" which may be easily replaced when worn. The "point" 47 is secured to the body 48 in any desired way, as by countersunk bolts. A vertical fin 77 is also provided, as shown.

Pivotally secured to the members 23, at 49, is the vibrating or shaking means 50. This comprises a series of zig-zag bars 51 arranged parallel with each other, as shown, to produce a riddle or grate, the rear end of each bar being bent down, as shown at 72. Vibration is communicated to element 50 by means of links 52, pivoted at their tops to the crank disks 17 by means of crank pins 19, whereby each rotation of shaft 16 produces one complete vibration of the element 50. The amplitude of vibration is adjusted by selecting the appropriate one of the holes 18 to hold the crank pin, and the frequency of the vibration is controlled by adjusting the driven element 12 to its proper position on shaft 13 to secure the desired speed of said shaft 13.

Rigidly held to said disk 17 by the crank pin 19 is the pulley 53, which is belted to pulley 55, loosely pivoted to element 50, by means of link belt 54, an idler pulley 56 mounted on a slotted slide 57 serving to adjust the tension of the belt in the well-known way.

Secured to element 50 in any desired way, as by links 58, is a conveyer 59, best shown in Figs. 3 and 6. This conveyer comprises a series of cross bars 60, each having a plurality of projecting prongs 61 of such length as just to clear the tops of the zig-zag bars 51, as shown. The cross bars 60 are secured to two link belts 62 which are positively driven by the pulleys 63 on shaft 64 and run over similar idle pulleys 63 on shaft 65. The ends of the cross bars 60 are guided in slots 84 in frame members 66, best shown in Fig. 6. Means comprising movable bearings 84' and tightening bolts 85 are provided for tightening the link-belts 62, 62, as shown in Fig. 6.

Rotation is transmitted to shaft 64 through pulley 67 from pulley 69 by means of link belt 68, an idler pulley 70 supported on a slotted slide 71, being provided in the usual way.

Secured to the frame, as at 74, is a rod 73, bent as shown, and held to link 21 by chains 75, the lower ends of said rod being curved down, as shown at 76.

As shown in Fig. 5, each road wheel 4, 5, is provided with a hub 78, these hubs being identical except that they are "right" and "left" respectively, the difference being only in the direction of the pawls and teeth. The interior of the hub is provided with ratchet teeth or serrations 79 coöperating with a plurality of pawls 80, four as here shown, each pivotally held at its inner end in the member 81 which is rigidly secured to shaft 3 to drive the latter. Each pawl 80 is outwardly pressed by a corresponding spring 91. These hubs are so placed on the machine that a forward turn of the corresponding road wheel will positively rotate the shaft 3, whereas a reverse turn will allow the pawls to ride over the ratchet teeth, thus allowing the machine to make turns.

The wheels 4 and 5 may be spaced closer or farther from each other by securing the hubs 78 at different places on the axle 3, said hubs and axle being secured to each other by single pins 86 passing through holes 87 in the hubs and corresponding holes 88 in the axle 3. A nut 89 and cotter pin 90 are used to secure each hub to the axle 3 so that the hub is free to rotate about the axle except as restrained by its internal mechanism.

Appropriate lubricating means are provided, of course, at all bearings, as shown by the reference character L at various places on the figures.

The operation of the machine is the following:

The wheels 4 and 5 are adjusted to the proper spacing for the width of row to be dealt with and the machine is then drawn into position at the end of a row. The operator in seat 43 now pulls lever 25 toward himself a sufficient distance to sink the plow 46 to the proper amount in the ground, and then presses the pedal 37 to the right with his foot and holds it there for a few moments, after the machine is started in motion, whereby the clutch elements 27 and 28 become engaged and remain so, after the foot leaves the pedal. The member 73 which precedes the plow serves to separate the vines from those in adjacent rows, and prepares the plants for the digging action of the plow. The plow 46 digs up the entire plants, and they pass back and up over the zig-zag bars 51. The prongs 61 of the conveyer catch the vines and assist in feeding them over these bars, and finally discharging them over the downwardly inclined portions 72. By means of the crank disk 17 and connected parts, the whole structure including the bars 51 and conveyer 59 are periodically moved up and down, the extent and frequency of this vibration being controlled by the holes 18 and pin 19, and by the position of driven element 12 on shaft 13. Thus the machine is readily adjustable to suit any depth of the peanuts in the ground, and the consistency and dampness of the ground, so that no matter what the conditions are, the peanuts will be discharged from the rear of the machine with practically all the earth shaken off and with the plant not mutilated in any way. The vertical fin 77 just back of the plow serves as a rudder to keep the plow 46 from deviating from the proper path.

While I have herein disclosed one specific embodiment of my invention, it will be obvious that many changes may be made in various features thereof without departing from the invention or sacrificing any of the advantages thereof. It is therefore to be understood that the machine disclosed is to be considered as illustrative only, and that the invention is not to be limited thereby to the form shown.

What I claim as my invention is:

1. In a machine of the character described, a conveyer having an endless belt carrying projections, a series of bars forming a riddle, the riddle being secured to the conveyer and so spaced therefrom that the projections pass close to the adjacent surfaces of the series of bars, means for vibrating the combined conveyer and riddle, and means for operating the conveyer, whereby the material supplied to the machine is vibrated and simultaneously conveyed along the surface of the vibrating riddle.

2. In a machine of the character described, a conveyer having an endless belt carrying projections, a series of bars forming a riddle, said bars being of zig-zag shape, and arranged substantially parallel to each other, the riddle being secured to the conveyer and so spaced therefrom that the projections pass close to the adjacent surfaces of the series of bars, means for vibrating the combined conveyer and riddle, and means for operating the conveyer, whereby the material supplied to the machine is vibrated and simultaneously conveyed along the surface of the vibrating riddle.

3. In a machine of the character described, a conveyer having an endless belt carrying projections, a series of bars forming a riddle, the riddle being secured to the conveyer and so spaced therefrom that the projections pass close to the adjacent surface of the series of bars, means for vibrating the combined conveyer and riddle, means for operating the conveyer, whereby the material supplied to the machine is vibrated and simultaneously conveyed along the surface of the vibrating riddle, and means for adjusting the amplitude of the vibration.

4. In a machine of the character described, a conveyer having an endless belt carrying projections, a series of bars forming a riddle, the riddle being secured to the conveyer and so spaced therefrom that the projections pass close to the adjacent surfaces of the series of bars, means for vibrating the combined conveyer and riddle, means for operating the conveyer, whereby the material supplied to the machine is vibrated and simultaneously conveyed along the surface of the vibrating riddle, and means for adjusting the frequency of the vibration.

5. In a machine of the character described, a conveyer having an endless belt carrying projections, a series of bars forming a riddle, the riddle being secured to the conveyer and so spaced therefrom that the projections pass close to the adjacent surfaces of the series of bars, means for vibrating the combined conveyer and riddle, means for operating the conveyer, whereby the material supplied to the machine is vibrated and simultaneously conveyed along the surface of the vibrating riddle, means for adjusting the amplitude of the vibration and independent means for adjusting the frequency of the vibration.

In testimony whereof I affix my signature.

MORDECAI M. NIXON.